ent [19] [11] 4,030,372
Miyamoto [45] June 21, 1977

[54] DRIVING METHOD FOR TANGENTIAL BELT AND APPARATUS THEREFOR
[75] Inventor: Noriaki Miyamoto, Kariya, Japan
[73] Assignee: Kabushiki Kaisha Toyoda Jidoshokki Seisakusho, Japan
[22] Filed: Feb. 21, 1975
[21] Appl. No.: 551,765
[30] Foreign Application Priority Data
Feb. 27, 1974 Japan .............................. 49-23107
Feb. 13, 1975 Japan .............................. 50-17379
Feb. 13, 1975 Japan .............................. 50-17380
[52] U.S. Cl. .................................. 74/221; 226/113
[51] Int. Cl.² ................................... F16H 7/00
[58] Field of Search ............ 254/138; 226/189, 35, 226/113, 183; 74/242.9, 242.12; 221, 227, 242.1

[56] References Cited
UNITED STATES PATENTS

| 1,319,109 | 10/1919 | Piez | 74/227 |
|---|---|---|---|
| 2,185,079 | 12/1939 | Hall | 74/227 |
| 2,202,045 | 5/1940 | Cohn et al. | 74/221 |
| 2,251,322 | 8/1941 | Buhrendorf | 226/183 |
| 2,827,804 | 3/1958 | Wolfenden et al. | 74/221 |
| 3,503,859 | 3/1970 | Goncarous et al. | 226/189 |
| 3,583,619 | 6/1971 | Shepherd | 226/113 |
| 3,586,228 | 6/1971 | Hergert | 226/183 |
| 3,656,674 | 4/1972 | Morse | 226/35 |
| 3,707,252 | 12/1972 | Kasecky et al. | 226/113 |
| 3,768,716 | 10/1973 | Bastiaans | 226/113 |
| 3,841,545 | 10/1974 | Ginghur, Jr. | 226/113 |

Primary Examiner—L. J. Paperner
Assistant Examiner—Kenneth Noland
Attorney, Agent, or Firm—Burgess, Ryan and Wayne

[57] ABSTRACT

An endless belt driving apparatus is disclosed, wherein by equalizing all loads imposed on driven pulleys mounted on spindles simultaneously driven by one endless belt, and by selecting contact angles between the endless belt and each driven pulley in such a fashion that said angles gradually decrease from upstream to downstream, equal loads can be maintained on each spindle.

8 Claims, 31 Drawing Figures

DRIVING METHOD FOR TANGENTIAL BELT AND APPARATUS THEREFOR

This invention relates to a driving method and an apparatus for an endless belt which simultaneously drives a plurality of driven pulleys mounted on spindles. More specifically such driven pulleys can be driven by an endless belt under an equal but minimum load necessary for said driven pulleys. Thus, this invention can prevent any damage to the bearings of the spindles and also can reduce the driving power for said spindles.

In some spinning machines, a plurality of spindles are simultaneously driven by one tangential belt. In many of such spinning machines, a plurality of units, each unit consisting of a driven pulley and a guide pulley of similar arrangement wherein every driven pulley has a similar load, are provided for pressing said endless belt against a driven pulley. And said plurality of units are arranged linearly and with an equal distance therebetween and, thus, the spindles within said units are arranged in a row. In such an arrangement, the most upstream spindle has an excess amount of load compared to the load on the most downstream spindle, and each contact angle between the belt and the surface of the driven pulleys is the same given angle. Therefore, the excess load on the upstream spindle can cause damage to the bearing of said spindle and, also, an excess amount of driving force is necessary.

The object of the present invention is to provide a method and an apparatus, in which above-mentioned drawbacks do not appear. By equalizing all the loads imposed on the driven pulleys of the spindles simultaneously driven by one endless belt, and by selecting the contact angles between the endless belt and each driven pulley in such a fashion that said angles gradually decrease from upstream to downstream, an equal load can be maintained on each spindle.

Another object of the present invention is to provide an apparatus, in which each guide pulley is arranged so that the optimum contact angle of the belt can be attained automatically, by providing a plurality units of the same dead weight, each unit consisting of a guide pulley and other members, and by constructing said unit so that it is movable tangentially to the running direction of said endless belt.

A further object of the present invention is to provide an apparatus, in which the optimum contact angle of the belt with each unit can be maintained by fixing the position of the guide pulley after a trial operation to find its optimum position.

Other objects and characteristics features of the present invention will become apparent as the description proceeds. The invention will be best be understood with reference to the accompanying drawings in which.

Figure 1:
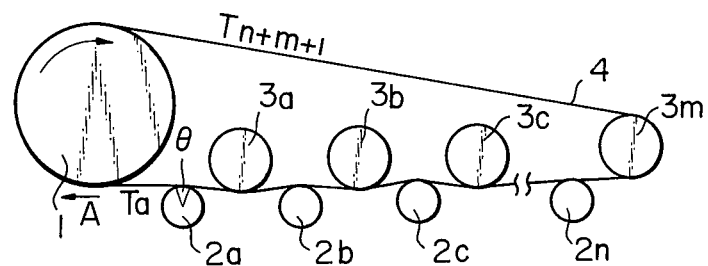
FIG. 1 shows a schematic view of the conventional tangential belt driving apparatus.
Figure 3:
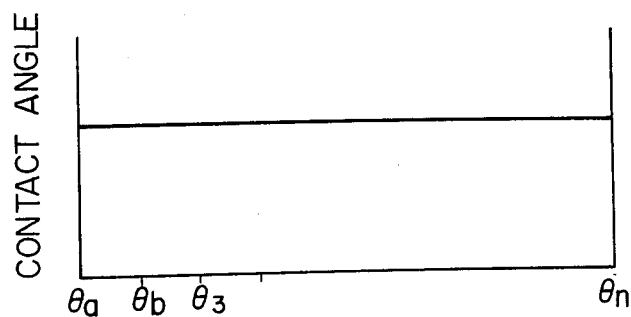
Figure 4:
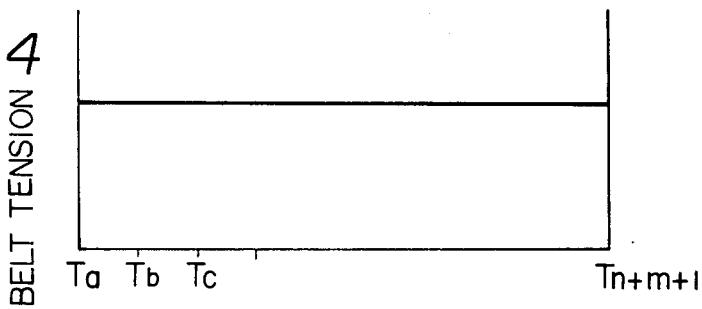
Figure 5:
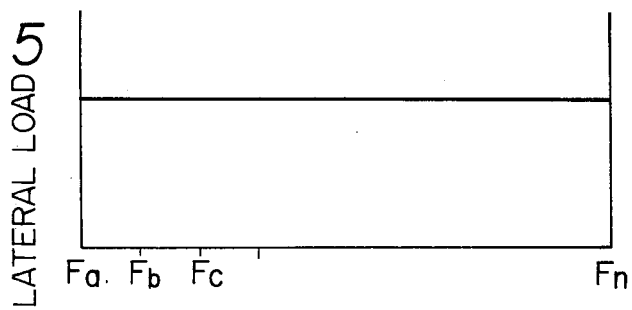
Figure 6:
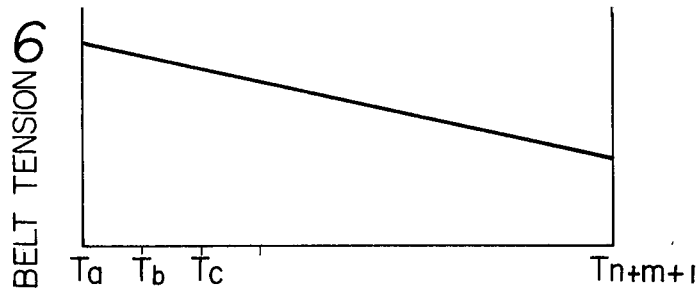
Figure 7:
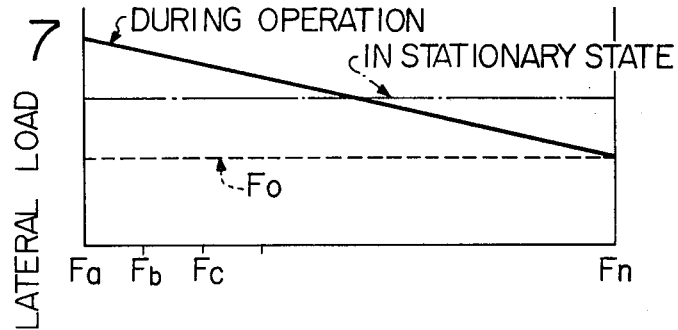
Figure 8:
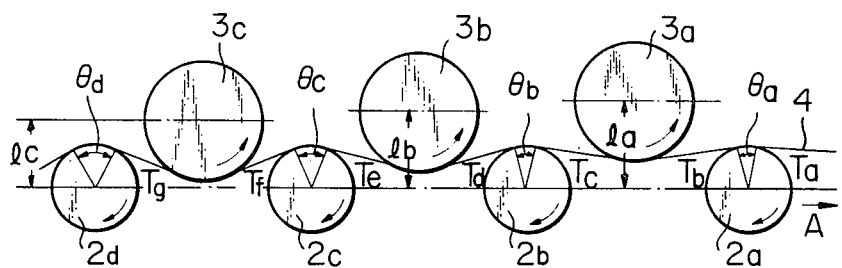
Figure 9:
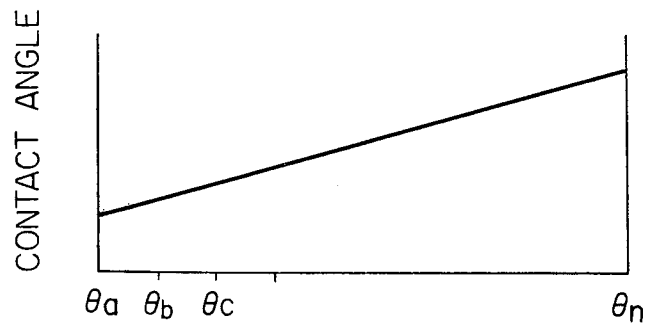
Figure 10:
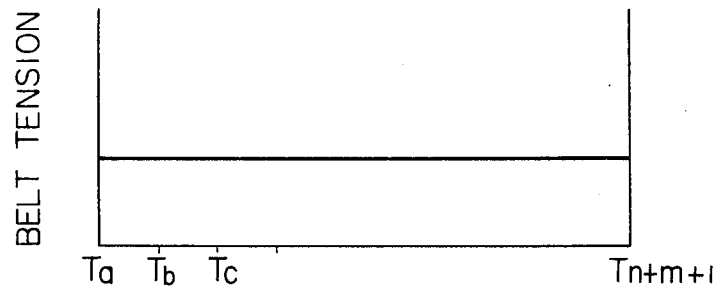
Figure 11:
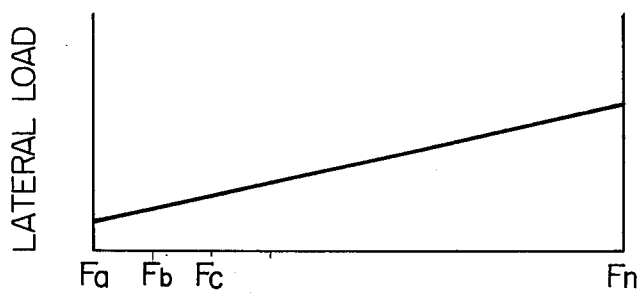
Figure 12:
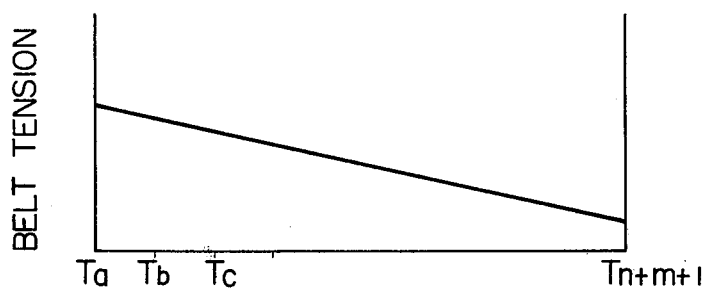
Figure 13:
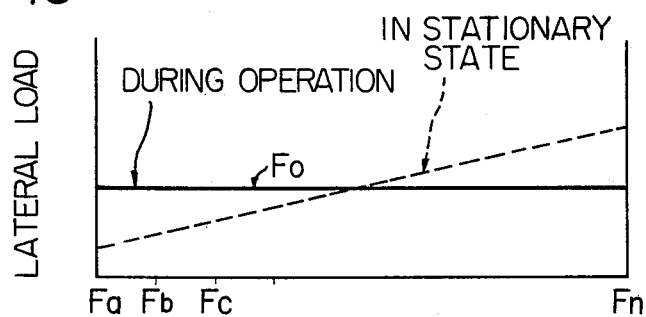
Figure 18:
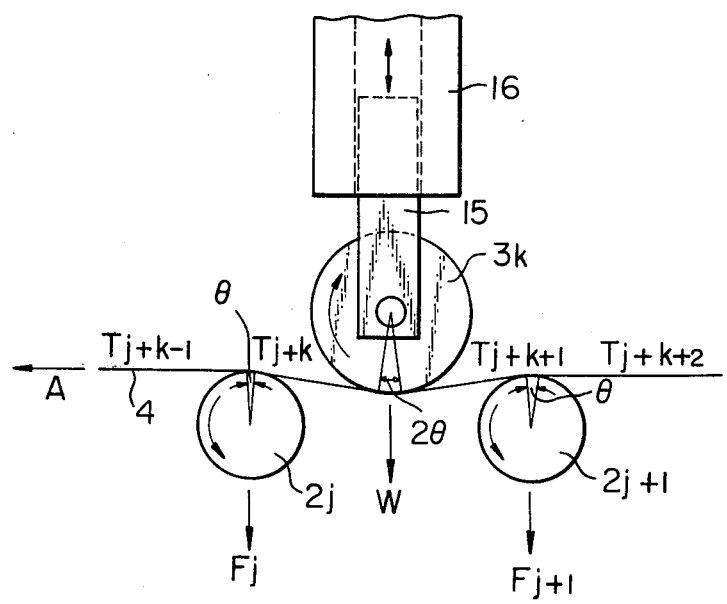
Figure 19:
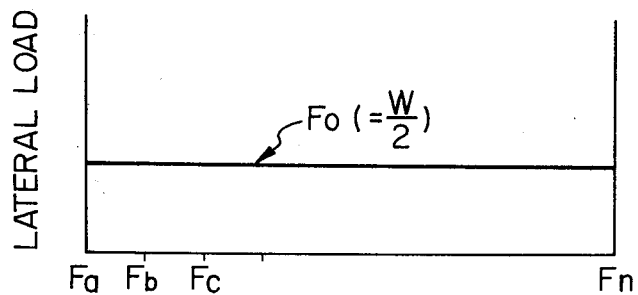
Figure 20:
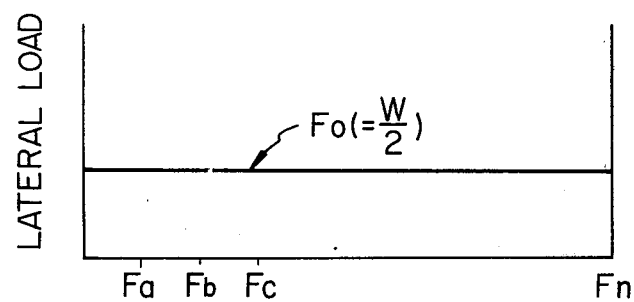
Figure 25:
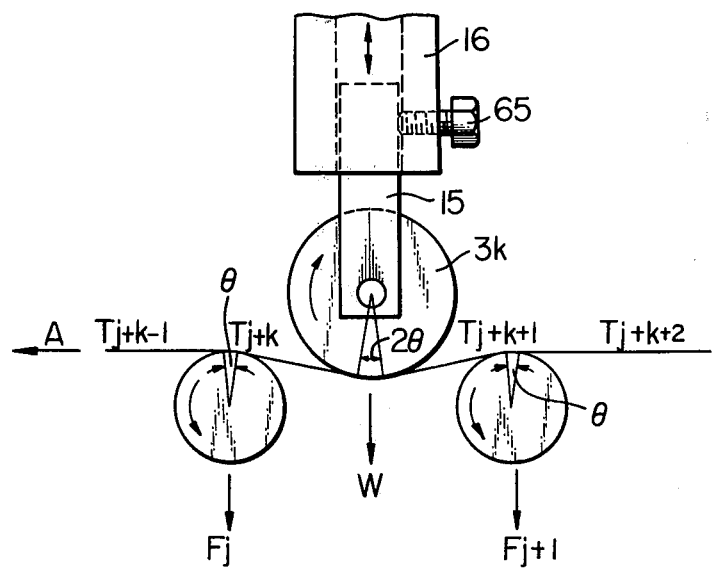
Figure 26:
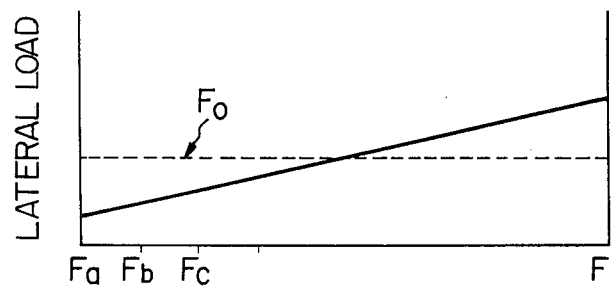

FIGS. 3 through 7 show operational diagrams of the apparatus shown in FIG. 1, wherein FIGS. 3, 4 and 5 show the apparatus in the stationary state, and FIGS. 6 and 7 show the apparatus in an operational state;

FIG. 8 shows a view of one embodiment of the present invention similar to that in FIG. 7;

FIGS. 9 through 13 show operational diagrams of the apparatus of the present invention as shown in FIG. 8, wherein FIGS. 9, 10 and 11 show the apparatus in the stationary state and FIGS. 12 and 13 show the apparatus in an operational state;

FIGS. 14 through 17 show enlarged views of the apparatus shown in FIG. 8;

FIG. 18 shows a view of another embodiment of the present invention similar to that shown in FIG. 8;

FIGS. 19 and 20 are operational diagrams of the embodiment shown in FIG. 18, wherein FIG. 19 shows the apparatus in an operational state and FIG. 20 shows the apparatus in a stationary state;

FIGS. 21 through 24 are partially enlarged views of the apparatus shown in FIG. 18;

FIG. 25 shows a view of to a further embodiment of the present invention similar to that shown in FIG. 8;

FIG. 26 in an operational diagram of the embodiment shown in FIG. 25;

FIGS. 27 through 31 are partially enlarged views of the apparatus of FIG. 25.

Figure 2:
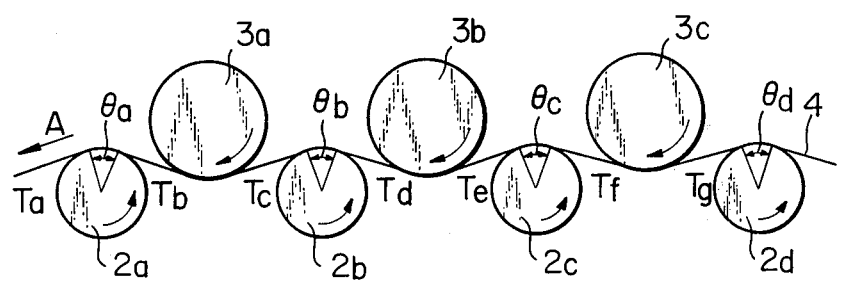
FIG. 2 shows a partially enlarged view of the apparatus shown in FIG. 1.

In some spinning machines, a number of spindles are tangentially driven by one belt simultaneously. As is shown in FIGS. 1 and 2 in these spinning machines, a belt 4 is hung on a prescribed number $n$ of spindles $2_a$, $2_b, 2_c, \ldots 2_n$, and the belt 4 is driven by a driving pulley 1. Further, guide pulleys $3_a, 3_b, \ldots 3_m$ are disposed so as to contact the belt 4 with respective spindles at an appropriate contact angle $\theta$, so that so-called tangential driving is carried out.

In the conventional tangential drive system, all of the contact angles $\theta_a, \theta_b, \theta_c, \ldots \theta_n$ between the belt 4 and respective spindles $2_a, 2_b, \ldots 2_n$ are made equal to one another as shown in FIG. 3. Accordingly, the same load is imposed on the bearings of respective spindles in the stationary state. More specifically, if the belt tension imposed between the spindle $2_a$ and the guide pulley $3_a$ is designated as $T_a$, the belt tension imposed between the spindle $2_a$ and the guide pulley $3_a$ is designated as $T_b$ and belt tensions imposed between subsequent spindles and pulleys are designated as $T_c, T_d, \ldots T_{n+m+1}$, since the following relation is established as shown in FIG. 4 in the stationary state:

$$T_a = T_b = T_c = \ldots = T_{n+m+1},$$

the following relation as shown in FIG. 5 is established among lateral loads $F_a, F_b, F_c, \ldots F_n$ imposed on bearing of respective spindles:

$$F_a = F_b = F_c = \ldots = F_n.$$

When the machine is operated so that the driving pulley 1 rotates in the clockwise direction and the belt 4 moves in the direction indicated by an arrow A in FIG. 1, since the following relation as shown in FIG. 6 is established:

$$T_a > T_b > T_c > \ldots > T_{n+m+1},$$

the following relation as shown in FIG. 7 is established among lateral loads on bearing of the spindles:

$$F_a > F_b > F_c > \ldots > F_n.$$

It is necessary that during operation the slip between each spindle and the belt 4 should be reduced to such a low level that no substantial trouble is caused by the slip. For attainment of this feature, it is required that a minimum lateral load $F_0$ as shown in FIG. 7 assuring prevention of slips should be maintained. Accordingly, excessive forces corresponding the difference between the actual lateral load and the minimum lateral load, namely forces $(F_a - F_o)$, $(F_b - F_o)$, ... $(F_n - F_o)$, are imposed on bearings of respective spindles. Therefore, in the conventional tangential drive system, lives of bearings are shortened and excessive powers are consumed for operation of the system.

As is seen from FIG. 8 illustrating an embodiment of this invention, according to this invention, the contact angle $\theta$ between the spindle (driven pulley) and the belt 4 is gradually decreased toward the downstream in the direction of movement of the belt. More specifically, the contact angle between one spindle and the belt 4 is larger than the contact angle between the belt and the subsequent spindle disposed downstream in the direction of movement of the belt. In this invention, by this arrangement the loads imposed on bearings of respective spindles are made substantially equal to one another during operation and the maximum lateral load is reduced.

This invention will now be described by reference to the accompanying drawings.

Referring to FIG. 8, axes of spindles $2_a$, $2_b$, $2_c$, ... are positioned on the same horizontal plane and guide pulleys $3_a$, $3_b$, $3_c$, ... are disposed so that distances $l_a$, $l_b$, $l_c$, ... between axes of the pulleys and said horizontal plane are gradually reduced and hence, contact angles $\theta_a$, $\theta_b$, $\theta_c$, $\theta_d$, ... of spindles with the belt 4 are gradually increased as follows:

$$\theta_a < \theta_b < \theta_c < \theta_d \ldots$$

This relation is shown in FIG. 9. In this case, belt tensions $T_a$, $T_b$, ... $T_{n+m+1}$ are the same in the stationary state and are expressed by a horizontal line as shown in FIG. 10. Lateral loads $F_a$, $F_b$, ... $F_n$ are substantially in proportion to the contact angles under belt tensions in the stationary state as far as contact angles are within a range customarily adopted in the tangential drive system. Accordingly, the relation of $F_a < F_b < F_c < \ldots < F_n$ as shown in FIG. 11 is established. During operation, the tensions should naturally be increased toward the downstream in the direction of movement of the belt as shown in FIG. 12, and since contact angles are reduced toward the downstream, lateral loads on the bearing of the respective spindles are made substantially equal to one another as shown in FIG. 13 and the lateral loads as a whole can be reduced. Belt tensions $T_a$, $T_b$, ... $T_{n+m+1}$ during operation are determined by the initial tension on the belt and the load on each pulley, but they are not influenced by the contact angle. Accordingly, if the contact angles are so chosen that the relation of $\theta_a < \theta_b < \theta_c < \ldots < \theta_n$ as shown in FIG. 9 is established and the products of these contact angles and corresponding belt tensions during operation are made equal in respect to all spindles, lateral loads $F_a$, $F_b$, ... $F_n$ during operation can be made equal to one another as shown in FIG. 13. Namely, the lateral loads $F_a$, $F_b$, ... $F_n$ of all spindles can be made substantially equal to the minimum lateral load $F_o$ necessary for reducing slips substantially to zero during operation. Therefore, excessive and ineffective forces $(F_a - F_o)$, $(F_b - F_o)$, ... $(F_n - F_o)$ unavoidably imposed in the conventional system are not brought about at all in this invention.

In this arrangement, since the following relation as shown in FIG. 11 is established among lateral loads in the stationary state:

$$F_a < F_b < F_c < \ldots < F_n,$$

it is believed that excessive loads may be imposed on some of spindles. However, as is apparent from a comparison of FIG. 7 with FIG. 13, lateral loads in the stationary state in the system of this invention are generally much smaller than lateral loads during operation in the conventional system. Therefore, there is no concern regarding excessive lateral loads in this invention. Further, since it is possible to relax the belt in the stationary state by simple means, there is no problem in this connection.

When the system of this invention is actually worked, the object of this invention can be fully attained if only the larges lateral load is reduced, even when lateral loads on respective spindles are not completely equal to one another. In view of this fact, it will readily be understood that it is not indispensably necessary that contact angles of respective spindles should be gradually increased but the feature where spindles are divided into groups including a small number of spindles and the contact angles are changed group by group is included in the concept of this invention and the object of this invention can be fully attained also in accordance with this feature. For example, when spindles are divided in groups of 3 spindles and the contact angles are changed in the above-mentioned manner to establish the following relation:

$$\theta_a = \theta_b = \theta_c < \theta_d = \theta_e = \theta_f < \ldots < \theta_{n-2} = \theta_{n-1} = \theta_n,$$

it is possible to obtain lateral loads which are substantially equal from the practical viewpoint.

Figure 14:
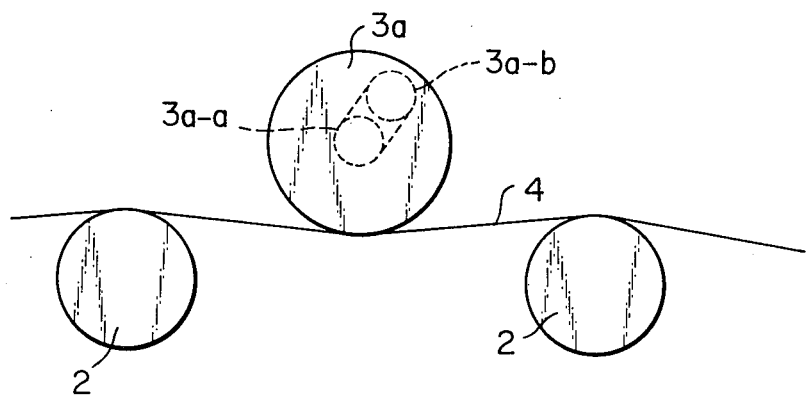

As means for changing the contact angles $\theta_a$, $\theta_b$, ... $\theta_n$, a method can be mentioned in which distances between axes of the spindles and the guide pulleys $3_a$, $3_b$, ... are changed as shown in FIG. 8, and a method in which, for example, the rotary shaft of the guide pulley $3_a$ is supported by an eccentric holding arm as shown in FIG. 14 so that the position of the rotary shaft of the pulley $3_a$ is continuously moved between the points $3_{a-a}$ and $3_{a-b}$. It is also possible to change gradually the diameters of the guide pulleys. Consideration may be given to changing the distances between every two adjacent spindles, but this method is not preferred from the practical point of view.

Figure 15:
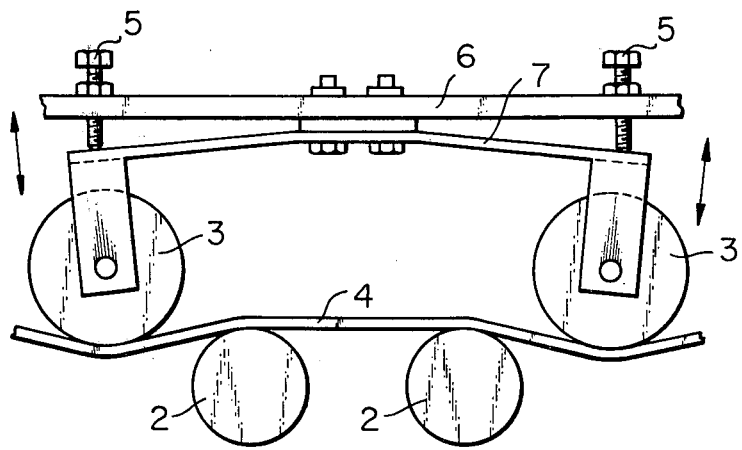

Another method for adjusting the contact angles appropriately is shown in FIG. 15. In this embodiment, guide pulleys 3 and 3 are laid on the upper face of the belt 4 having contact with the spindles 2 and 2, and the guide pulleys 3 and 3 can be moved obliquely upwardly by means of two adjusting screws 5. More specifically, two adjusting screws 5 are fitted to an attachment plate 6 fixed to a machine frame (not shown), and guide pulleys 3 and 3 are rotatably mounted on both the bent end portions of an elastic plate 7, the center of which is fixed to the attachment plate 6, so that the top ends of the adjusting screws 5 and 5 are fitted to the top faces of both the end portions of the elastic plate 7. In this arrangement, when the adjusting screws are rotated and moved downwardly, corresponding guide pulleys 3 shift downwardly, whereby contact angles between the belt 4 and the spindles adjacent to the guide pulleys are increased.

Figure 16:
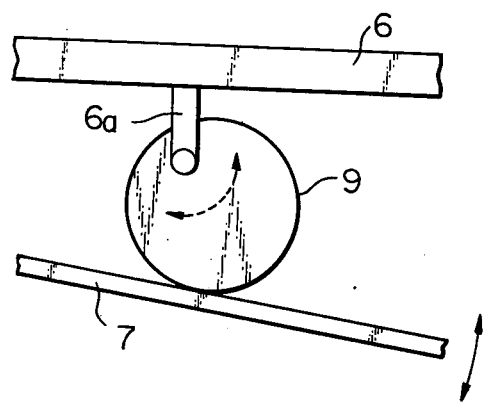

An eccentric cam 9 as shown in FIG. 16 may be used instead of the adjusting screw shown in FIG. 15. As is illustrated in FIG. 16, the eccentric cam 9 is rotatably mounted on the lower end of an arm 6a projecting downwardly from the attachment plate 6. When this eccentric cam 9 is rotated, the free end of the elastic plate 7 is moved in the vertical direction, whereby the position of the guide pulley and the contact angle are in turn changed.

Figure 17:
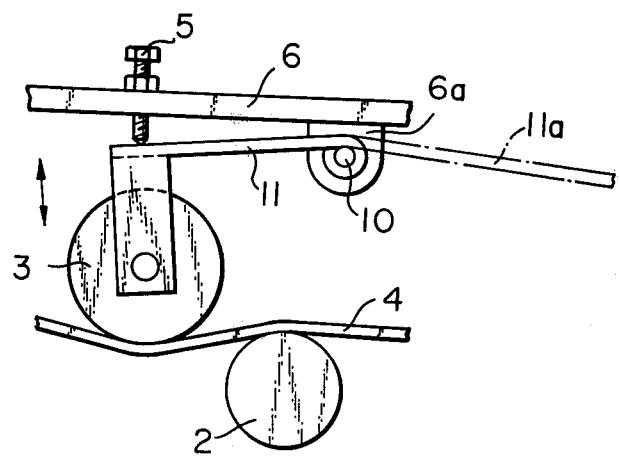

Still another method for adjusting the contact angles appropriately is shown in FIG. 17. In this embodiment, one end of a lever 11 is freely fitted on a shaft 10 mounted on the lower portion of an arm 6a fixed to an attachment plate 6, and a guide pulley 3 is rotatably mounted on the other bent end (movable end) of the lever 11. When the upper face of the lever 11 is pressed by an adjusting screw 5 fitted to an attachment plate 6, an appropriate contact angle is determined. Accordingly, as in the device shown in FIG. 15, the contact angle between the spindle 2 and the belt 4 can be changed by moving the adjusting screw 5 in the vertical direction. It is also possible to dispose the shaft 10 mounted on the arm 6a so that it projects in the backward direction (toward the back face of FIG. 17) and to fit freely to this projection one end of a lever 11a mounted to attach another guide pulley thereto, as shown in FIG. 17.

As is apparent from the foregoing illustration, according to this invention it is possible to prevent excessive lateral loads from being imposed on spindles and, therefore, there is attained an advantage that the lives of the bearings of the spindles can be prolonged even when the bearings of an ordinary grade are used. Further, since there is no fear of occurrence of slips even if the initial tension of the belt is reduced, the life of the belt can be prolonged and the power consumption can be reduced.

In another embodiment of this invention, by appropriately setting the total weight of guide pulleys and other members supported on a belt through these pulleys, contact angles necessary for moving driven pulleys are formed between each of the driven pulleys and the belt, and by arranging the guide pulleys so that the axis of each guide pulley is equidistantly separated from the axes of adjacent driven pulleys positioned on both the sides of the guide pulley, lateral loads imposed on these adjacent driven pulleys can be made substantially equal to each other. In this manner lateral loads imposed on all of driven pulleys can be made substantially uniform.

Referring to FIG. 18, one guide pulley is disposed for every two driven pulleys, and driven pulleys $2_j$ and $2_{j+1}$ are mounted in parallel to each other in the same horizontal plane. A guide pulley $3_k$ is mounted on the driven pulleys $2_j$ and $2_{j+1}$ through a belt 4, and the axis of the guide pulley $3_k$ is substantially equidistantly separated from the axes of the adjacent driven pulleys $2_j$ and $2_{j+1}$ positioned on both the sides of the guide pulley $3_k$. A supporting member 15 for the guide pulley $3_k$ is freely fitted to a supporting device 16 fixed to a machine frame (not shown), so that the guide pulley $3_k$ is supported rotatably and slidably only in the vertical direction. The total weight of the guide pulley $3_k$ and the supporting member 15 is designated as W and the contact angle between the guide pulley $3_k$ and the belt 4 is designated as $2\theta$.

If tensions on the belt upstream and downstream of the driven pulley $2_j$ are expressed as $T_{j+k-1}$ and $T_{j+k}$, respectively, and tensions on the belt upstream and downstream of the driven pulley $2_{j+1}$ are expressed as $T_{j+k+1}$ and $T_{j+k+2}$, respectively, effective tensions $P_j$, $P_{j+1}$ and $P_k$ on the driven pulleys $2_j$ and $2_{j+1}$ and the guide pulley $3_k$ are expressed as follows:

$$P_j = T_{j+k+1} - T_{j+k} \qquad (1)$$

$$P_{j+1} = T_{j+k+1} - T_{j+k+2} \qquad (2)$$

$$P_k = T_{j+k} - T_{j+k+1} \qquad (3)$$

In the tangential drive system, in order to drive a number of driven pulleys having a very small contact angle with the belt by means of one belt, it is generally required that lateral loads should be reduced as much as possible. Accordingly, the effective tensions $P_j$, $P_{j+1}$ and $P_k$ are very small as compared with belt tensions $T_{j+k+1}$, $T_{j+k}$, $T_{j+k+1}$ and $T_{j+k+2}$. Therefore lateral loads $F_j$ and $F_{j+1}$ on the driven pulleys $2_j$ and $2_{j+1}$ can be expressed as follows:

$$F_j \approx (T_{j+k-1} + T_{j+k}) \sin \frac{\theta}{2} \approx (T_{j+k-1} + T_{j+k}) \frac{\theta}{2} \qquad (4)$$

$$F_{j+1} \approx (T_{j+k+1} + T_{j+k+2}) \sin \frac{\theta}{2} \approx (T_{j+k+1} + T_{j+k+2}) \frac{\theta}{2} \qquad (5)$$

From the balance of forces in the guide pulley $3_k$, the following equation can be derived.

$$W = (T_{j+k} + T_{j+k+1}) \sin\theta = (T_{j+k} + T_{j+k+1})\theta \qquad (6)$$

From the above equations (1) to (6), $F_j$ and $F_{j+1}$ are rearranged as follows:

$$F_j \approx \frac{W}{2} \cdot \frac{1 - \frac{P_j}{2T_{j+k}}}{1 + \frac{P_k}{2T_{j+k}}} \qquad (7)$$

$$F_{j+1} \approx \frac{W}{2} \cdot \frac{1 + \frac{P_{j+1}}{2T_{j+k}}}{1 - \frac{P_k}{2T_{j+k}}} \qquad (8)$$

Since each of $(P_j/2T_{j+k}, P_{j+1}/2T_{j+k}$ and $P_k/2T_{j+K}$ is nearly equal to 0, $F_j$ and $F_{j+1}$ are expressed as follows:

$$F_j \approx \frac{W}{2}$$

$$F_{j+1} \approx \frac{W}{2}$$

Namely, if the weight W of the guide pulley $3_k$ and the guide pulley-supporting member 15 is arranged so as to establish the above relation, the axial load on each of the driven pulleys can be maintained at the same value W even though a gradient of tension is caused with respect to the belt.

If the minimum axial load on the driven pulley is designated as $F_o$ and the above total weight is adjusted so as to establish the relation of $W = 2F_o$ as shown in FIG. 19, the lateral load on the driven pulley can be maintained at the necessary minimum level $F_o$ either during operation or in the stationary state. FIGS. 19 and 20 illustrate the state where axial loads on driven pulleys are made uniform either during operation or in the stationary state.

The foregoing illustration has been made with reference to the case where one guide pulley is mounted per two driven pulleys as shown in FIG. 18. In case one guide pulley is provided per driven pulley, as is seen from the foregoing illustration, the above-mentioned total weight W is arranged so that the relation of W = $F_o$ is established.

Figure 21:
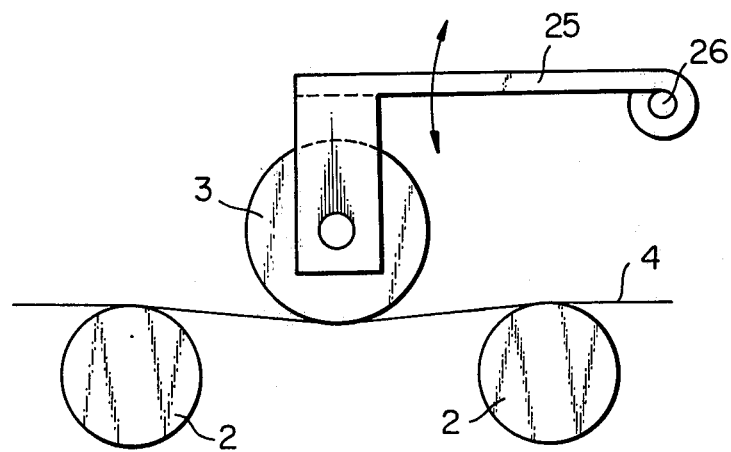

Referring to FIG. 21, a guide pulley 3 is rotatably supported on a supporting arm 25, and this supporting arm 25 is hinged to a machine frame (not shown) through a pin 26. In this case, the contact angle with a belt 4 is determined by the total weight of a guide pulley 3 and the supporting arm 25.

Figure 22:
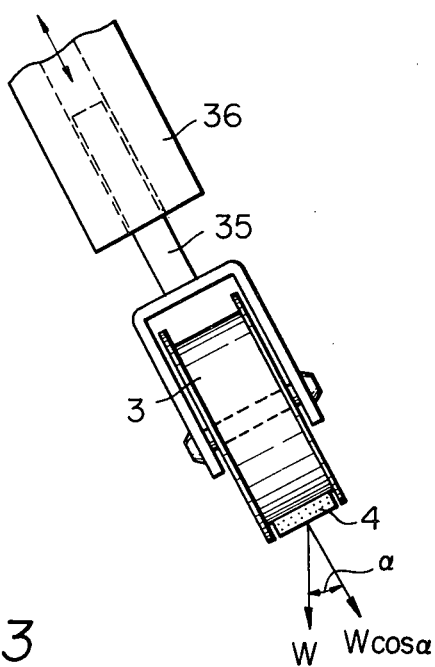

FIG. 22 illustrates a case where the belt is hung with an inclination to the horizontal plane. A guide pulley 3 is supported on a supporting member 35 so that the pulley can rotate in the direction inclined with an angle $\alpha$ from the vertical direction (the direction of the pull of gravity), and the supporting member 35 is freely fitted to a supporting device 36 fixed to a machine frame (not shown). If the total weight of the guide pulley 3 and the supporting member 35 is designated as W, the belt 4 is pressed with a force of $W \cdot \cos\alpha$. Accordingly, if the value of W is set so that the relation of $W \cdot \cos\alpha = 2F_o$ is established, the lateral load on the driven pulley can be maintained at the minimum necessary level.

Figure 23:
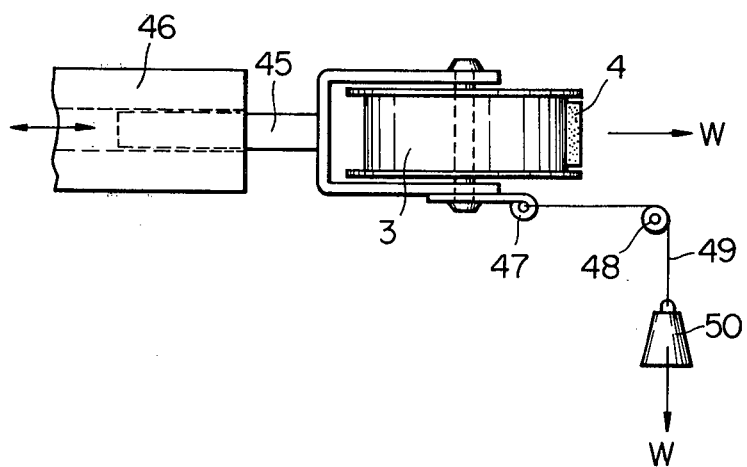

FIG. 23 illustrates a case where the belt face is kept vertical. A guide pulley 3 is supported on a supporting member 45 holding the axial center of the guide pulley 3, so that the guide pulley 3 can move in the horizontal direction, and the supporting member 45 is freely fitted to a supporting device 46 fixed to a machine frame (not shown). A weight 50 is hung on a hanging fitting 47 fixed to the supporting member 45, through a guide pulley 48 with a flexible member 49, and because of the weight W of the weight 50 the belt 4 is pressed to the guide pulley 3. In this case, the direction of movement of the guide pulley may be inclined with an optional angle.

The foregoing illustration has been given with respect to cases where the total weight of the guide pulley and the guide pulley-supporting member, or the total of the guide pulley, the guide pulley-supporting member and the weight attached to the guide pulley-supported member, is used as the weight to be imposed on the belt. However, only the weight of the guide pulley may be directly used as such weight to be imposed on the belt. In this case, provision of the supporting member is omitted and the guide pulley is rotatably mounted on a guide pulley-guiding member (not shown). In short, the weight of the guide pulley having contact with the belt and the other members supported on the belt through the guide pulley is set so as to establish the above relation.

In this embodiment, one guide pulley may be disposed per driven pulley, but from the practical point of view, it is preferred that one guide pulley be disposed per 2 driven pulleys.

Figure 24:
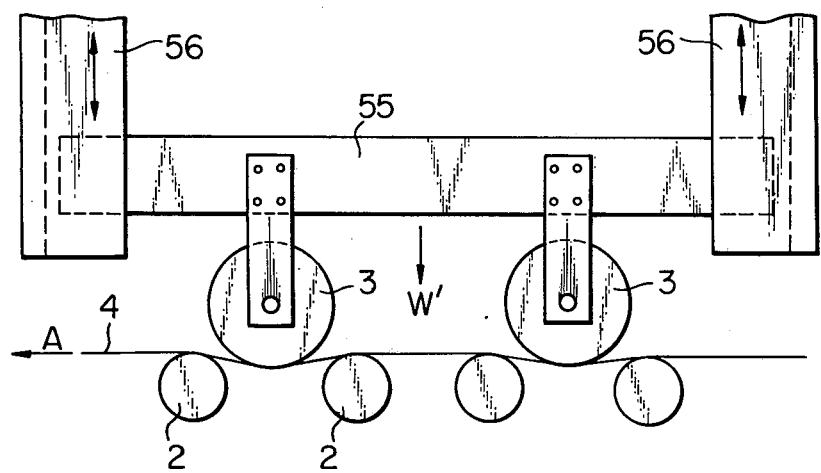

FIG. 24 illustrates a case where many guide pulleys 3 are supported by one guide pulley-supporting member 55. Both ends of the guide pulley-supporting member 55 are freely fitted to guide members 56 and the belt 4 is pressed in the vertical direction. In this case, the total weight W' of the guide pulleys 3 and the guide pulley-supported member 55 is set so as to establish the relation of $W' = 2 \cdot n \cdot F_o$.

In the foregoing embodiment of the invention, since the total weight of the guide pulley and other members supported on the belt through this guide pulley is utilized for control of lateral loads on driven pulleys, provision of a complicated guide pulley-adjusting apparatus as inevitably used in the conventional tangential belt drive systems can be omitted, and the operation can be performed very simply and assuredly. Furthermore, there is attained an advantage that the loads can be made uniform, and equal to the lateral load of $F_o$.

In a further embodiment of this invention, by appropriately setting the total weight of guide pulleys and other members supported on a belt through these pulleys, similar results as in the preceeding embodiment can be attained.

FIG. 25 shows an example in which guide pulley-supporting members are fixed by means of bolts or fixing means.

FIG. 26 is a diagram illustrating the distribution of the axial load attained in the stationary state after the position of each guide pulley has been fixed during operation.

Figure 27:
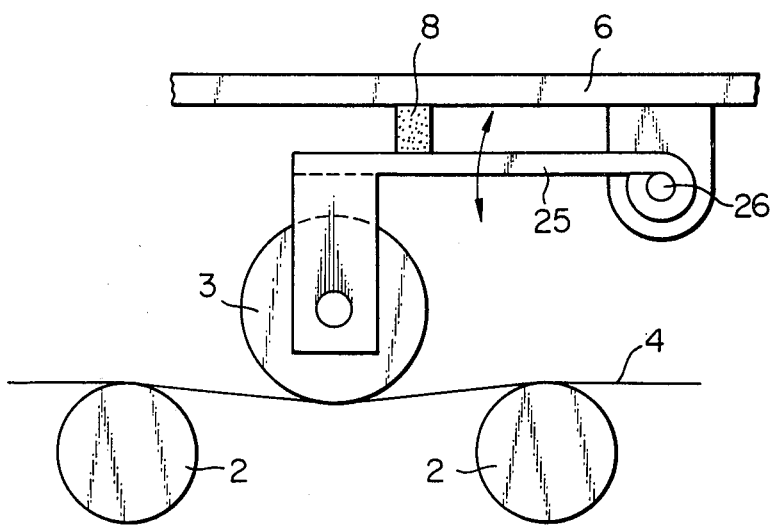

Referring to FIG. 27, a guide pulley 3 is rotatably supported on a supporting arm 25, and the supporting arm 25 is hinged to a machine frame (not shown) through a pin 26. A spacer 8 is inserted between the supporting arm 25 and a fixing plate 6 attached to the machine frame to fix the position of the guide pulley 3. Fixing of the position of the guide pulley 3 is enhanced by the repulsive force of the belt 4.

Figure 28:
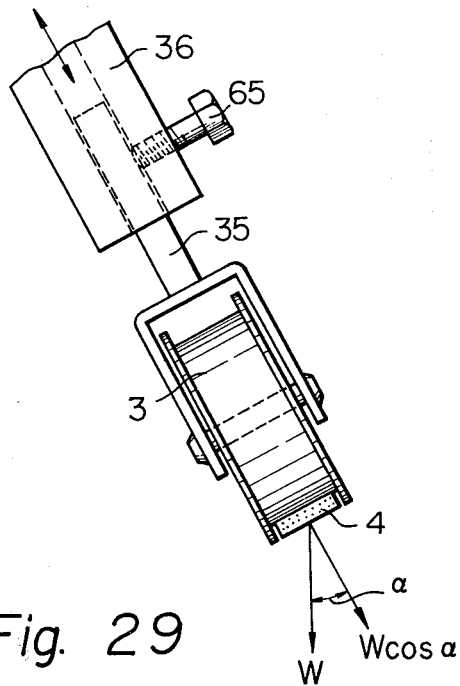

FIG. 28 illustrates a similar example to FIG. 22, except for the provision of a set screw 65. The set screw 65 is mounted on the supporting device 36 to fix the guide pulley-supporting member 35.

Figure 29:
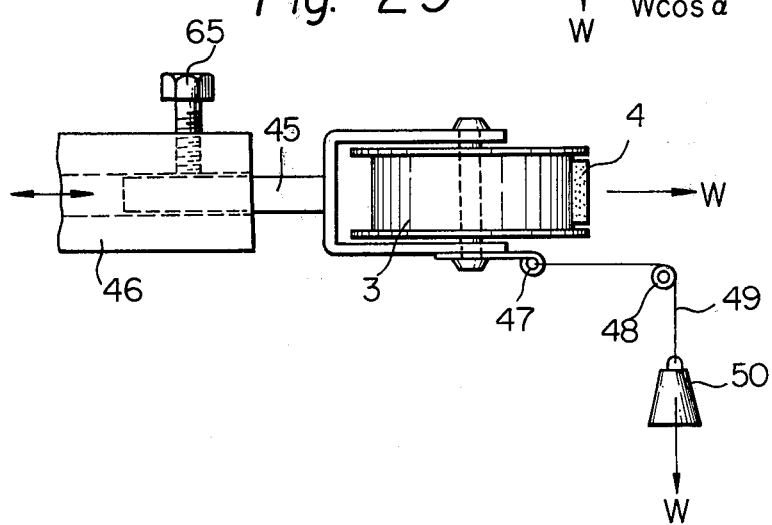

FIG. 29 illustrates a similar example to FIG. 23, except for the provision of a set screw 65. In this case, the position of the guide pulley 3 is fixed by the set screw 65 mounted on the supporting device 46. It is possible to adopt a method in which the position of the guide pulley 3 is appropriately determined during operation by using a weight, the so determined position is fixed by a fixing device and, then, the weight may be removed. According to this method, the total weight of the machine can be reduced.

Figure 30:
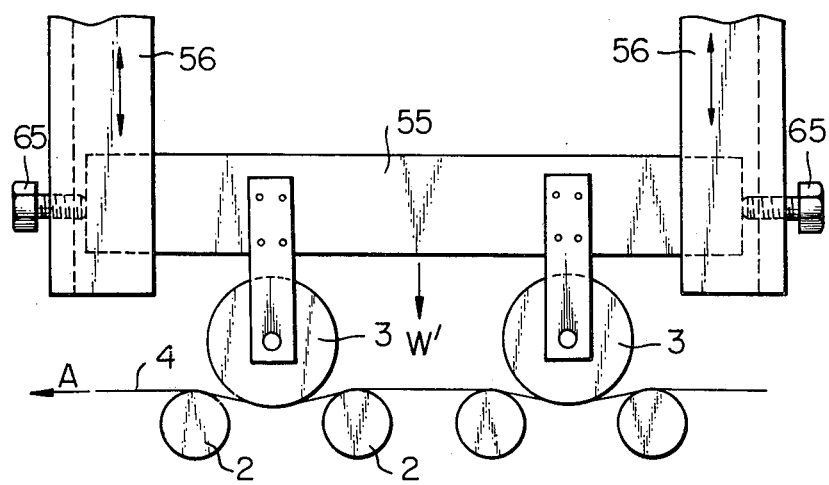

FIG. 30 illustrates a similar example to FIG. 24, except for the provision of a set screw 65.

Bolts 5 are mounted on the side faces of the guide members 56 and the position of each guide pulley 3 is set by fixing the supporting members 55 by these bolts 5.

Figure 31:
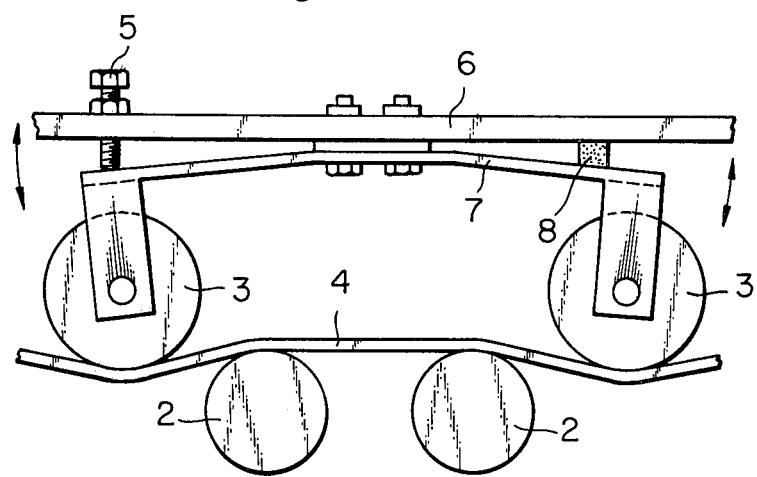

In the example illustrated in FIG. 31 which is similar to FIG. 15, guide pulleys 3 are supported by a elastic plate 7, and they press the belt 4 in the vertical direction by their own weights. An adjusting screw 5 or spacer 8 is disposed on the elastic plate 7 to fix the position of each guide pulley 3.

The foregoing illustrations have been given with respect to cases where the total weight of the guide pulley and the guide pulley-supporting member, or the total weight of the guide pulley, the guide pulley-supporting member and the weight attached to the guide-pulley-supporting member, is used as the weight to be imposed on the belt. However, only the weight of the guide pulley may be directly used as the weight to be imposed on the belt. In this case, provision of the supporting member is omitted and the guide pulley is rotatably mounted on a guide pulley-guiding member (not shown). In short, the weight of the guide pulley having contact with the belt and other members supported on the belt through the guide pulley is set so as to establish the above relation.

In this embodiment, one guide pulley may be disposed per driven pulley, but from the practical point of view, it is preferred that one guide pulley be disposed per 2 driven pulleys.

In this embodiment of this invention, since the total weight of the guide pulley and other members supported on the belt through this guide pulley is utilized for automatically providing contact angle capable of imparting a constant lateral load to each of driven pulleys during operation and the position of the guide pulley is then fixed and kept in the fixed state, provision of a complicated guide pulley-adjusting apparatus as inevitably used in the conventional tangential belt drive systems can be omitted and the operation can be performed very simply and assuredly. Furthermore, there is attained an advantage that the loads can be made uniform. Also, since the axial load imposed on each driven pulley can be maintained at a minimum necessary level, the power consumption can be reduced and the lives of the bearings can be prolonged due to preventing the occurrence of damage to the bearings. Moreover, according to the embodiment of this invention, since the position of the guide pulley is fixed, there is attained another advantage that the occurrence of vibrations of the belt, such as observed at the initial stage of operation when the guide pulley is not fixed, can be effectively prevented. In case a weight is attached to the guide pulley-supporting member, if the weight is removed, there is attained an effect that the total weight of the machine can be reduced.

What is claimed is:

1. An apparatus for driving a plurality of driven pulleys or pairs of driven pulleys, wherein said apparatus comprises an endless belt tangentially contacting said driven pulleys, a driving pulley for driving said endless belt, a plurality of driven pulley means each including from one to two driven pulleys mounted to be driven by said endless belt, and a plurality of guide pulleys positioned intermediate said pulley means to press against said endless belt so as to bring it into contact with said driven pulley means at given contact angles, comprising means for setting said contact angles between said endless belt and the driven pulley means, so that said contact angles on all of said pulley means are progressively decreased toward the down stream direction of movement of the belt.

2. In a driving system for a plurality of pulley means each having from one to two driven pulleys wherein an endless belt is driven by a driving pulley and contacts each of the driven pulley means tangentially at an angle, and guide pulleys are provided engaging the belt to maintain contact between the belt and the driving pulley, the improvement comprising means mounting the guide pulleys intermediate the driven pulley means to decrease the contact angles between the belt and all of the driven pulley means progressively in the downstream direction of movement of the belt, whereby differences in lateral loading of the driven pulleys by the belt are minimized.

3. The driving system of claim 2 wherein the axes of said driven pulleys are in a common plane, and said means mounting said guide pulleys comprises means mounting guide pulleys between pairs of said driven pulleys, with the distance between the axes of said guide pulleys and plane decreasing in the down stream direction of movement of said belt.

4. The driving system of claim 2 wherein said means mounting said guide pulleys comprises means mounting a guide pulley between a pair of adjacent driven pulleys, and means for adjusting the relative distances between the axis of said guide pulley and the axes of said adjacent driven pulleys.

5. The driving system of claim 2 wherein said means mounting said guide pulleys comprises a lever, means freely pivoting said lever, means rotatably mounting a guide pulley on said lever at a point displaced from the pivot thereof, whereby said guide pulley engages said belt adjacent one side of a driven pulley, and adjusting means for adjusting the relative displacement of said lever with respect to said belt.

6. Apparatus for driving a plurality of driven pulley, wherein said apparatus comprises an endless belt, a driving pulley for driving said endless belt, a plurality of driven pulleys tangentially contacting and mounted to be driven by said endless belt, and a plurality of guide pulleys mounted to deform said endless belt so as to bring it into contact with said driven pulleys at an angle, at least one said guide pulley being disposed between two adjacent driven pulleys, said one guide pulley being arranged at equal distance from the axes of said two driven pulleys, a freely displaceable dead weight coupled to said guide pulley, the combined weight of said dead weight and said guide pulley being as great as the pressure imposed on said endless belt, whereby said pressure is as great as the pressure necessary to turn said driven pulley, said apparatus further comprising a fixing means for fixing the operating position of said one guide pulley, after each position of each guide pulley has been settled by said respective dead weight during operation.

7. In a driving system for a plurality of driven pulleys wherein an endless belt is driven by a driving pulley and tangentially contacts each of the driven pulleys at an angle, and guide pulleys are provided engaging the belt to maintain contact between the belt and the driving pulley, the improvement comprising means mounting the guide pulleys to decrease the contact angles between the belt and the driven pulleys in the downstream direction of movement of the belt, whereby differences in lateral loading of the driven pulley by the belt are minimized, said mounting means comprising means mounting a pair of adjacent guide pulleys to engage said belt on opposite sides of a pair of adjacent driven pulleys, and means for adjusting the positions of said guide pulleys.

8. In a driving system for a plurality of driven pulleys wherein an endless belt is driven by a driving pulley and tangentially contacts each of the driven pulleys at an angle, and guide pulleys are provided engaging the belt to maintain contact between the belt and the driving pulley, the improvement comprising means mounting the guide pulleys to decrease the contact angles between the belt and the driven pulleys in the downstream direction of movement of the belt, whereby differences in lateral loading of the driven pulleys by the belt are minimized, said mounting means comprising a weight, means mounting a guide pulley on said weight, and means mounting said weight for free movement toward and away from said belt.

* * * * *

UNITED STATES PATENT OFFICE
CERTIFICATE OF CORRECTION

Patent No. 4,030,372      Dated June 21, 1977

Inventor(s) Noriaki Miyamoto

It is certified that error appears in the above-identified patent and that said Letters Patent are hereby corrected as shown below:

Column 4, line 16: "larges" should read --largest--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*